United States Patent Office 2,828,242
Patented Mar. 25, 1958

2,828,242

ORAL THERAPEUTIC COMPOSITION AND PROCESS OF PREPARATION

Marshall E. Bennett, New York, N. Y., assignor to The Upjohn Company, Kalamazoo, Mich., a corporation of Michigan No Drawing. Application February 9, 1954
Serial No. 409,261

11 Claims. (Cl. 167—51.5)

This invention relates to therapeutic compositions and to a process for their preparation. More particularly, it relates to fluid stable suspensions which are primarily intended for oral use in the treatment of gastro-intestinal disorders which are either of an infectious origin or have actual or potential infectious complications, and to a process for the preparation of such compositions.

Gastro-intestinal disorders having infectious complications are among the more common afflictions of all animals, including the human race. Among the more discomforting symptoms of such disorders are fever, loss of appetite, vomiting, diarrhea and irritation of the gastro-intestinal membranes. Several therapeutic agents are known to counteract such symptoms, for example, various combinations of kaolins, bentonite and pectin. These therapeutic agents tend to alleviate some of the symptoms of the disorder by adsorbing toxins, reducing diarrhea, and soothing irritated membranes of the gastro-intestinal tract. They may, however, have little effect upon what may be the primary cause or a serious complication of the disorder, i. e., infection. Neomycin is one of the more recently developed antibiotics which has achieved recognition for its usefulness in such gastro-intestinal disorders where infection is a factor.

Prior to the present invention the combination of neomycin with bentonite and pectin had never been accomplished nor had the beneficial results actually obtained thereby been appreciated. The present invention is a result of the solution of special problems which arose in the attempt to produce such a preparation.

It is therefore one of the principal objects of the present invention to provide thereapeutic compositions which are effective in the treatment of gastro-intestinal disorders having either an infectious origin or actual or potential infectious complications. Another object of the present invention is to provide such compositions in which there is little or no interference or harmful reaction between the active ingredients thereof. Still another object is to provide such compositions which form fluid, stable suspensions for oral use in humans and animals. Still another object is to provide a process for the preparation of such compositions which for practical purposes prevents or minimizes reactions in or other interferences with the preparation thereof. Other objects of this invention will be apparent to those skilled in the art to which the invention pertains.

The foregoing and additional objects have been accomplished by the provision of a novel composition comprising neomycin, bentonite, pectin and methylcellulose and a novel process for the preparation of such a composition.

The essential active ingredients of the novel compositions of the present invention are neomycin, bentonite, and pectin. The composition is preferably suspended in a liquid vehicle suitable for oral administration. The only limitations on the vehicle or diluent used are compatability with the active ingredients and suitability for human use. The combination is preferably prepared in an aqueous vehicle. Neomycin may be used in free form, or in the form of one of its therapeutically active salts, such as the sulfate. As the word "neomycin" is used in the present specification, it includes not only the free base but also the therapeutically active salts thereof. The word is also used in the same broad sense as in Waksman on Neomycin, Rutgers University Press, New Brunswick, New Jersey (1953). It includes forms B and C and mixtures of B and C. Methylcellulose is included in the composition to prevent or inhibit settling, to act as a suspending agent giving longer suspension qualities, and to prevent solid-gelling or excessive thickening. Without methylcellulose and the addition of neomycin to the aqueous vehicle before adding bentonite and pectin settling occurs in a matter of weeks, as compared with about one year to reach approximately the same degree of settling with methylcellulose in the composition. About one to three percent methylcellulose is considered operative for this purpose, with two percent being preferred. The viscosity of methylcellulose, measured in centipoise units, is important, though not critical, to the present invention. The preferred viscosity will vary with the amounts of neomycin, bentonite and pectin used, all of which can be varied considerably.

Kaolins may be used along with the bentonite in the composition for their therapeutic value in adsorbing toxins. The properties of both the kaolins and bentonite are responsible for the adsorption of toxins. Since methylcellulose tends to reduce surface tension, an anti-foam agent such as Tween 85 (polyoxyethylene sorbitan trioleate), is preferably added to the composition.

In attempting to add neomycin to a prepared composition containing bentonite and pectin, it was discovered that the composition thickened and became so viscous that it could not readily be poured from a bottle. Although the mechanism of action is not clearly understood, it is believed that the positively charged neomycin ion is reactive with negatively charged complex materials, such as pectic acid and bentonite present in the composition. However, it was unexpectedly discovered that this difficulty is avoided by changing the order of addition of ingredients to the completed composition. When the dry powders of bentonite and pectin are added to a solution of neomycin sulfate, the tendency to thicken is largely avoided.

At that point new problems developed: settling and packing occur after the product is allowed to stand on the shelf for a relatively short period of time, making the product difficult to resuspend by shaking. Several suspending agents were tried in an attempt to solve these problems. In the course of these experiments it was unexpectedly discovered that methylcellulose not only reduces the thickening produced by the addition of neomycin but also is the best of the suspending agents used. However, the order of mixing is still critical but methylcellulose should be present when the neomycin is intermixed with the bentonite and pectin. It was also discovered that the vehicle containing the bentonite, pectin and methylcellulose should be thoroughly stirred for several hours so that the bentonite and pectin are completely swelled before the neomycin is added. This generally requires from five to fifteen hours depending upon the quantity of material used and the stirring equipment itself.

The pH of the composition must satisfy both the requirements of the ingredients such as bentonite, pectin and kaolin on the one hand, and the neomycin and other possible antibacterial agents on the other. When neomycin is the only antibacterial agent present, a pH range between about 3.0 and 6.0 is operative with a range between 4.0 and 4.7 being preferred. The work of others (Schoenhard et al., Antibiotics and Chemotherapy 3, 41

(1953)) indicates that an acid pH is detrimental to the activity of neomycin. Surprisingly when formulated in the present composition neomycin has proven stable, and its antibiotic properties have remained unimpaired.

The amount of neomycin used in a composition such as that shown in Example 1 is between about 0.065 gram per fluid ounce to about 1.2 grams per fluid ounce, 0.25 to 0.5 gram being preferred. A concentration below about 0.065 gram per fluid ounce can be prepared but is generally considered to be below the therapeutically effective level of neomycin. A concentration greater than 1.2 grams per fluid ounce is operative but has a tendency toward greater settling. The amount of neomycin used, however, is not considered critical to the present invention since it varies with such factors as the amounts of the other materials used and the viscosity of methylcellulose.

Other antibacterial agents, such as the insoluble p-aminobenzenesulfonamides, and penicillin, or their therapeutically active insoluble salts and derivatives, although not critical to the present invention, can also be included in the novel compositions of the present invention whenever it is believed to be of value to utilize the combined antibacterial properties of the added materials and neomycin. Illustrative relatively insoluble sulfonamides include sulfadiazine, sulfamerazine, phthalylsulfathiazole, succinylsulfathiazole, sulfathiazole and sulfaguanidine.

Various other inert ingredients can also be present in the composition of the present invention to make them more convenient for administration and dispensing but are not considered critical thereto. These are the usual liquid oral pharmaceutical carriers and diluents, such as flavors, fillers, water and the like. An aqueous vehicle for the active ingredients is preferred.

The following examples are illustrative of the composition and process of this invention but are not to be construed as limiting.

EXAMPLE 1

One embodiment of the present invention can be illustrated by the following formulation showing the contents of 500 gallons:

*Formula for 500 gallons*

| Ingredients | Gals. | Lbs. | Ozs. | Grs. |
| --- | --- | --- | --- | --- |
| Methylparaben, U. S. P. | | | 8 | 6 | |
| Saccharin Soluble Gran., U. S. P. | | | | 13 | 148 |
| Citric Acid Po., U. S. P. | | | .3 | 15 | |
| Tween 85 | | | | 2 | 1 | 167 |
| Deionized water | 320 | | | | |
| Kaolin, N. F. | | 822 | | | |
| Pectin, N. F. | | 18 | 4 | | |
| Bentonite Powder, U. S. P. | | 82 | 8 | | |
| Methylcellulose, N. F., 25 cps. micronized | | 83 | 10 | | |
| Neomycin Sulfate Powder | | 45 | 12 | | |
| Deionized water (add sufficient to make up desired amount) | 500 | | | | |
| Citric Acid Powder, U. S. P. (to adjust pH) | | | | | |

A 500 gallon lot of the foregoing composition can be prepared in the following manner which also illustrates the novel process of the present invention: methylparaben, saccharin, citric acid and Tween No. 85 are dissolved in approximately 320 gallons of deionized water. Kaolin, methylcellulose 25 cps. (centipoise units), pectin and bentonite are weighed into a mixer and mixed for 25 minutes. The kaolin - methyl - cellulose - pectin - bentonite mixture is added to the water solution at such a rate as to wet the powders in a one hour period. The whole is mixed thoroughly and enough deionized water is added to make up volume to 490 gallons. This is mixed for a minimum of fifteen hours. Neomycin sulfate is dissolved in five gallons of deionized water and added to the foregoing. Enough deionized water is added to make up volume to 500 gallons. The whole is mixed thoroughly. The pH is adjusted to between 4.0 and 4.7 with citric acid. Assay indicated that the neomycin in the composition was both stable and potent. Clinical success for the composition is reported in Waksman on Neomycin, Rutgers University Press, New Brunswick, N. J. (1953), p. 167.

EXAMPLE 2

To a 500 gallon lot of the composition such as that shown in Example 1, 105 pounds and 13 ounces each of sulfadiazine and sulfamerazine as micronized powders are added to form a composition having the combined antibacterial properties of neomycin and the sulfonamides. This provides a composition containing 0.75 gram per fluid ounce of each of the added sulfonamides, i. e., sulfadiazine and sulfamerazine.

In place of the combined sulfonamides used above, any one of sulfaguanidine, sulfathiazole, phthalylsulfathiazole, or succinylsulfathiazole can be added in sufficient quantity to make up 1.5 grams per fluid ounce, or 105 pounds and ten ounces for each 500 gallon lot.

It is to be understood that the invention is not to be limited to the exact details of operation and exact compositions shown and described as obvious modifications and equivalents will be apparent to one skilled in the art, and the invention is therefore only to be limited by the scope of the appended claims.

I claim:

1. A therapeutic composition comprising neomycin, bentonite, pectin and methylcellulose as a fluid, stable suspension.

2. A therapeutic composition comprising neomycin sulfate, bentonite, pectin and methylcellulose in an aqueous vehicle suitable for oral use.

3. An oral therapeutic composition comprising neomycin sulfate, bentonite, kaolin, pectin, methylcellulose and a liquid oral diluent.

4. An oral therapeutic composition, adjusted to a pH between about 3.0 and 6.0, comprising neomycin, bentonite, kaolin, pectin, methylcellulose and a liquid oral diluent.

5. A therapeutic composition comprising neomycin, bentonite, pectin, methylcellulose and a member selected from the group consisting of sulfadiazine, sulfamerazine, sulfaguanidine, phthalylsulfathiazole and succinylsulfathiazole in an aqueous vehicle suitable for oral use.

6. The process for the preparation of an oral therapeutic composition which comprises adding neomycin to an aqueous vehicle containing bentonite, pectin and methylcellulose.

7. The process for the preparation of an oral therapeutic composition which comprises adding neomycin sulfate to an aqueous vehicle containing bentonite, pectin and methylcellulose.

8. The process for the preparation of an oral therapeutic composition which comprises adding neomycin sulfate to an aqueous vehicle containing completely swelled bentonite, kaolin, completely swelled pectin and methylcellulose.

9. The process which comprises preparing a fluid aqueous suspension of bentonite and pectin with methylcellulose and thereafter incorporating neomycin into said suspension in the proportion of between about 0.065 and 1.2 grams per fluid ounce.

10. The process of preparing a fluid suspension of bentonite, pectin, methylcellulose and neomycin in an aqueous vehicle which comprises preparing a fluid suspension containing at least completely swelled bentonite, completely swelled pectin, and methylcellulose, incorporating the neomycin therein in an amount sufficient to provide between about 0.065 and 1.2 grams per fluid ounce, and adjusting the pH to between about 3.0 and 6.0.

11. The process of preparing a fluid stable suspension of bentonite, pectin, methylcellulose, and neomycin sulfate in an aqueous vehicle which comprises preparing an aqueous vehicle containing at least bentonite, pectin, and methylcellulose, incorporating the neomycin sulfate therein in an amount sufficient to provide between about 0.065 and 0.5 gram per fluid ounce and adjusting the pH to between about 4.0 and 4.7.

References Cited in the file of this patent

FOREIGN PATENTS

| | | |
|---|---|---|
| 862,044 | Germany | Jan. 8, 1953 |
| 668,968 | Great Britain | Mar. 26, 1952 |

OTHER REFERENCES

J. A. M. A., June 23, 1951, p. 757 (Neomycin Plus Sulfa Drug for Oral Administration).

Lesser: "Products for Diarrhea," Drug and Cos. Ind., January 1948, pp. 40–42 and 118–125.